US012632006B2

(12) United States Patent
Kim

(10) Patent No.: US 12,632,006 B2
(45) Date of Patent: May 19, 2026

(54) GEOMETRIC PHASE IN-LINE SCANNING HOLOGRAPHY SYSTEM FOR TRANSMISSIVE OBJECT

(71) Applicant: CUBIXEL CO., LTD., Seoul (KR)

(72) Inventor: Tae Geun Kim, Seoul (KR)

(73) Assignee: CUBIXEL CO., LTD., Seoul (KR)

( * ) Notice: Subject to any disclaimer, the term of this patent is extended or adjusted under 35 U.S.C. 154(b) by 384 days.

(21) Appl. No.: 18/019,487

(22) PCT Filed: Jul. 15, 2021

(86) PCT No.: PCT/KR2021/009102
§ 371 (c)(1),
(2) Date: Feb. 3, 2023

(87) PCT Pub. No.: WO2022/035068
PCT Pub. Date: Feb. 17, 2022

(65) Prior Publication Data
US 2023/0297027 A1 Sep. 21, 2023

(30) Foreign Application Priority Data
Aug. 11, 2020 (KR) ........................ 10-2020-0100457

(51) Int. Cl.
*G03H 1/04* (2006.01)
*G01B 9/021* (2006.01)

(52) U.S. Cl.
CPC ........... *G03H 1/0443* (2013.01); *G01B 9/021* (2013.01); *G03H 2001/0447* (2013.01);
(Continued)

(58) Field of Classification Search
CPC ......... G02B 27/26; G02B 5/30; G03H 1/0443
(Continued)

(56) References Cited

U.S. PATENT DOCUMENTS 11,977,353 B2 * 5/2024 Kim .......................... G02B 5/32
2006/0028962 A1 * 2/2006 Zachar ............... G11B 7/24088
369/112.01
2013/0215730 A1 8/2013 Okamoto et al.

FOREIGN PATENT DOCUMENTS

KR 10-2012-0014355 A 2/2012
KR 10-2013-0081127 A 7/2013
(Continued)

OTHER PUBLICATIONS

International Search Report for PCT/KR2021/009102 mailed Nov. 17, 2021 from Korean Intellectual Property Office.
(Continued)

*Primary Examiner* — Audrey Y Chang
(74) *Attorney, Agent, or Firm* — Revolution IP, PLLC

(57) ABSTRACT

A geometric phase in-line scanning holography system for a transmissive object, includes: a polarization sensitive lens, which receives a linear polarization beam to generate a first spherical wave of right-sided circularly polarized light and a second spherical wave of left-sided circularly polarized light; a scan means for scanning the transmissive object by using an interference beam generated between the generated first and second spherical waves; a first beam splitter, which receives a beam having been transmitted through the trans-missive object, so as to split the received beam into first and second output beams; first and second polarizers for polar-izing the first and second output beams, respectively; and first and second photodetectors for detecting output beams having passed through the first and second polarizers.

10 Claims, 9 Drawing Sheets

(52) U.S. Cl.
    CPC .............. *G03H 2001/0452* (2013.01); *G03H
                2001/0458* (2013.01); *G03H 2223/17*
            (2013.01); *G03H 2223/18* (2013.01); *G03H
            2223/22* (2013.01); *G03H 2226/02* (2013.01)

(58) Field of Classification Search
    USPC ......................................... 359/1, 10, 11, 15
    See application file for complete search history.

(56) References Cited

FOREIGN PATENT DOCUMENTS

| | | | |
|---|---|---|---|
| KR | 10-2014-0008302 | A | 1/2014 |
| KR | 10-1441245 | B1 | 9/2014 |
| KR | 10-1955295 | B1 | 3/2019 |
| KR | 10-2056063 | B1 | 12/2019 |

OTHER PUBLICATIONS

Taegeun Kim et al., "Coaxial scanning holography", Optics Letters, Apr. 1, 2020, vol. 45, Issue 7, pp. 2046-2049.

* cited by examiner

[FIG. 1]
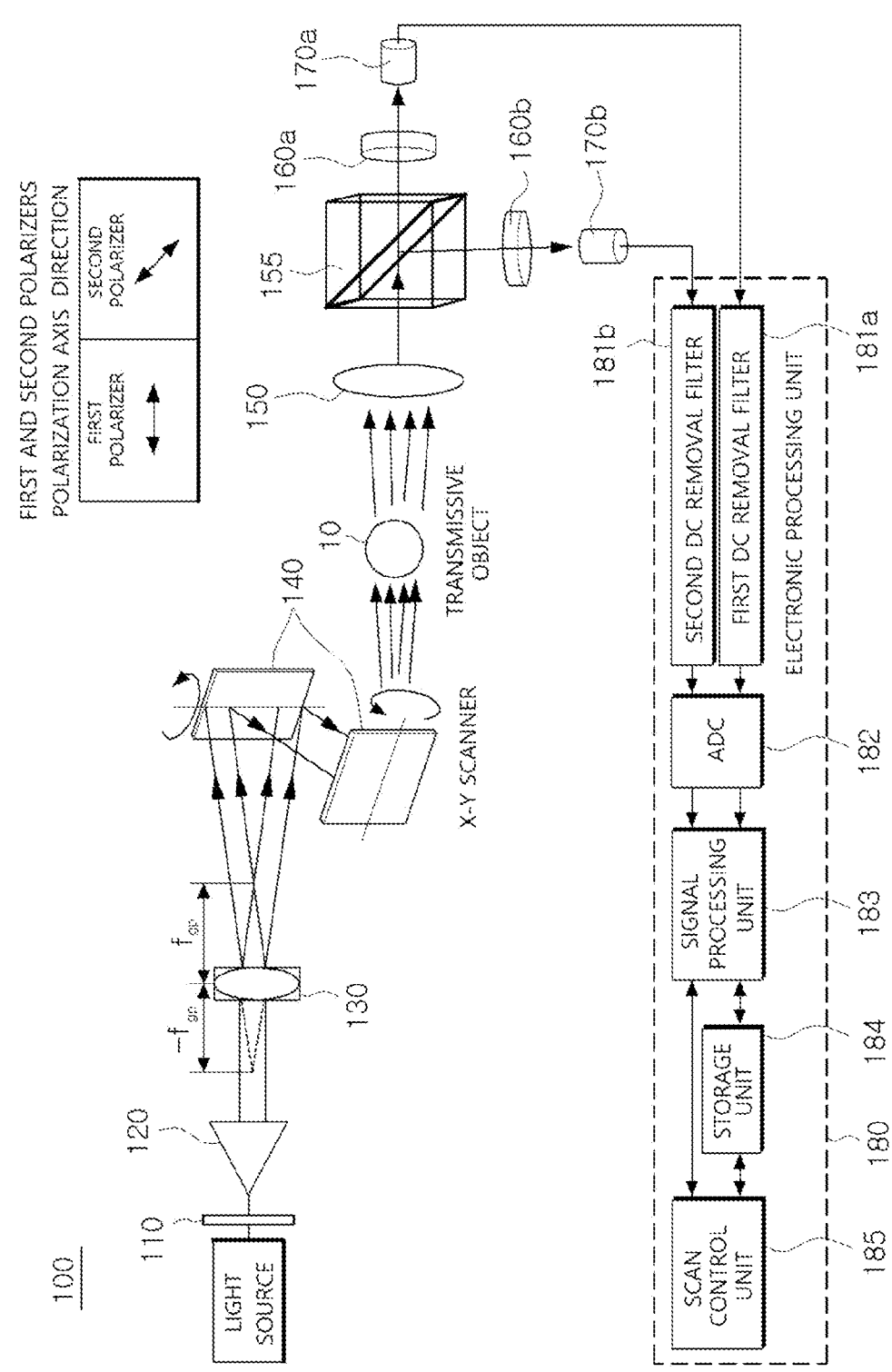

[FIG. 2]
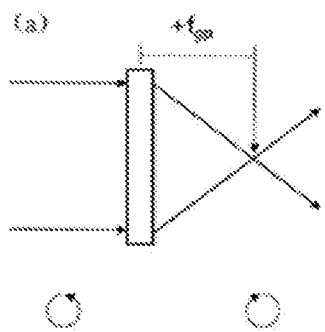
RIGHT-HANDED CIRCULARLY POLARIZED LIGHT    LEFT-HANDED CIRCULARLY POLARIZED LIGHT
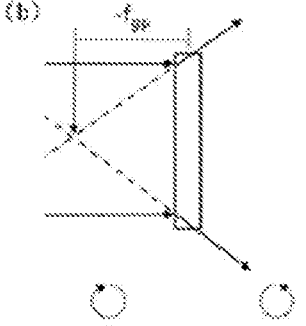
LEFT-HANDED CIRCULARLY POLARIZED LIGHT    RIGHT-HANDED CIRCULARLY POLARIZED LIGHT
GEOMETRIC PHASE LENS
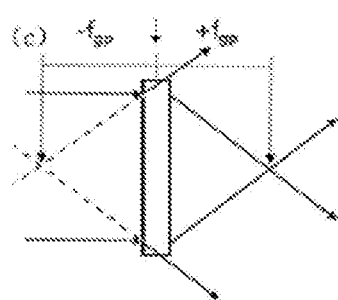
LINEARLY POLARIZED LIGHT    RIGHT-HANDED CIRCULARLY POLARIZED LIGHT AND LEFT-HANDED CIRCULARLY POLARIZED LIGHT

[FIG. 3]
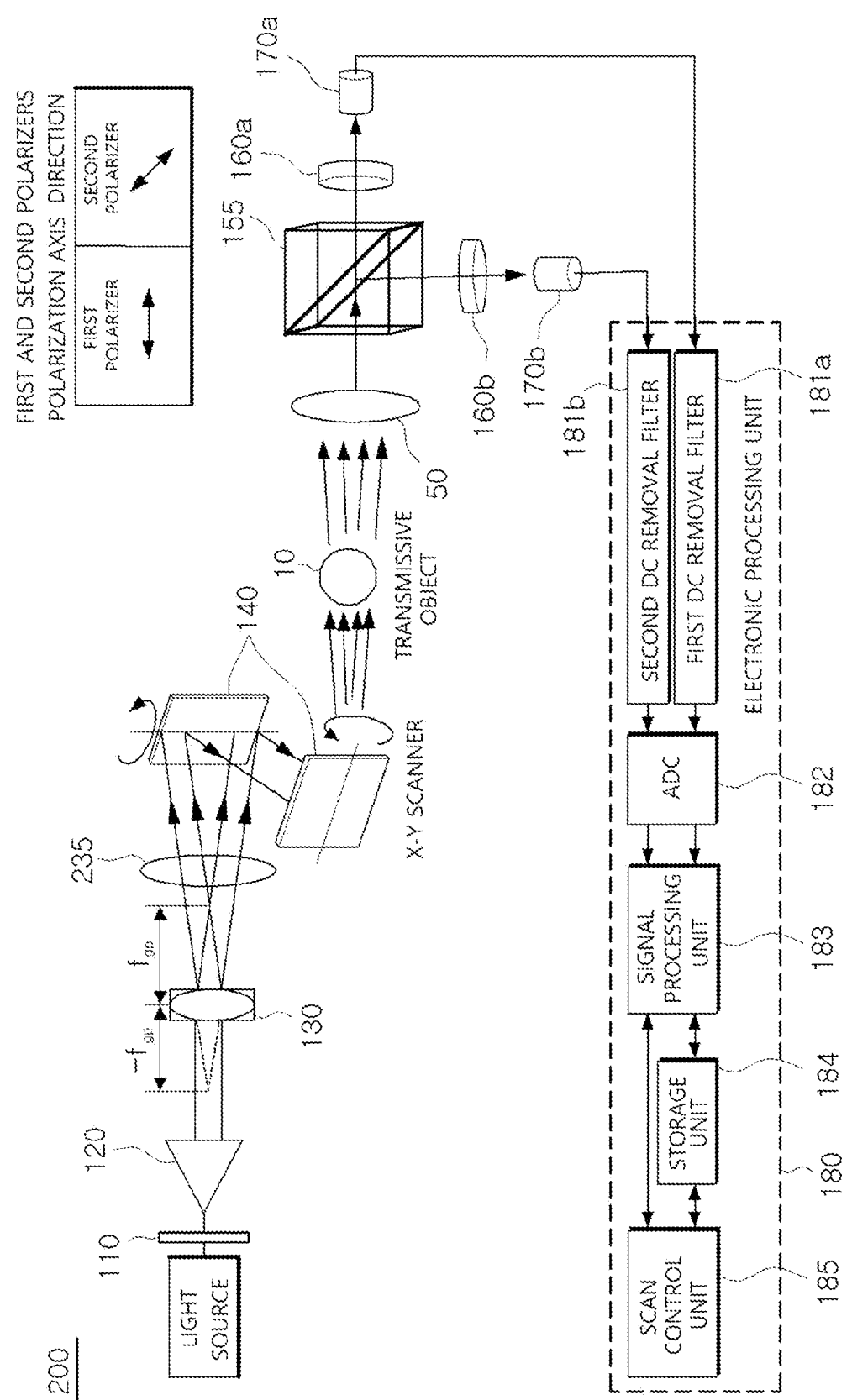

[FIG. 4]
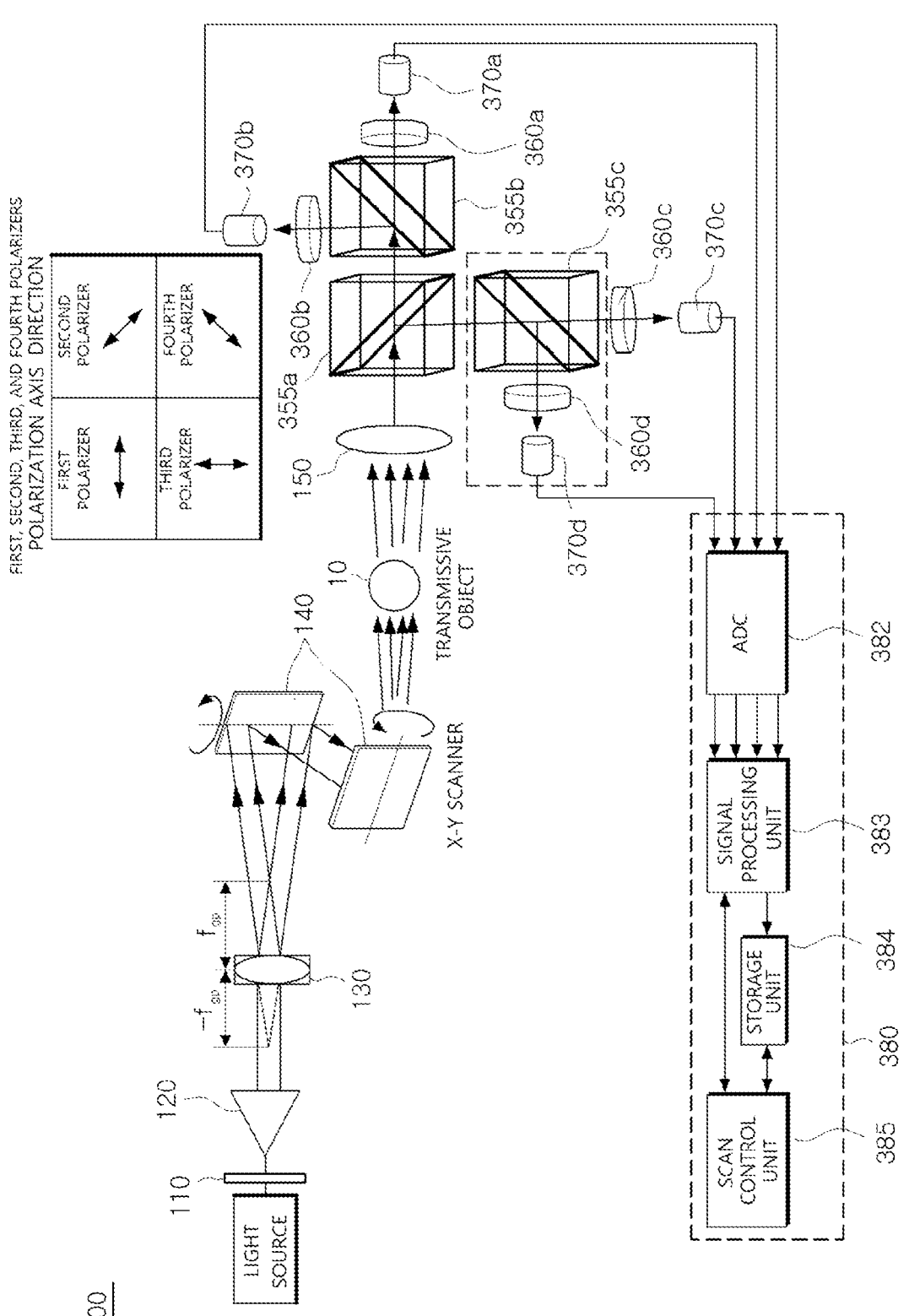

[FIG. 5]
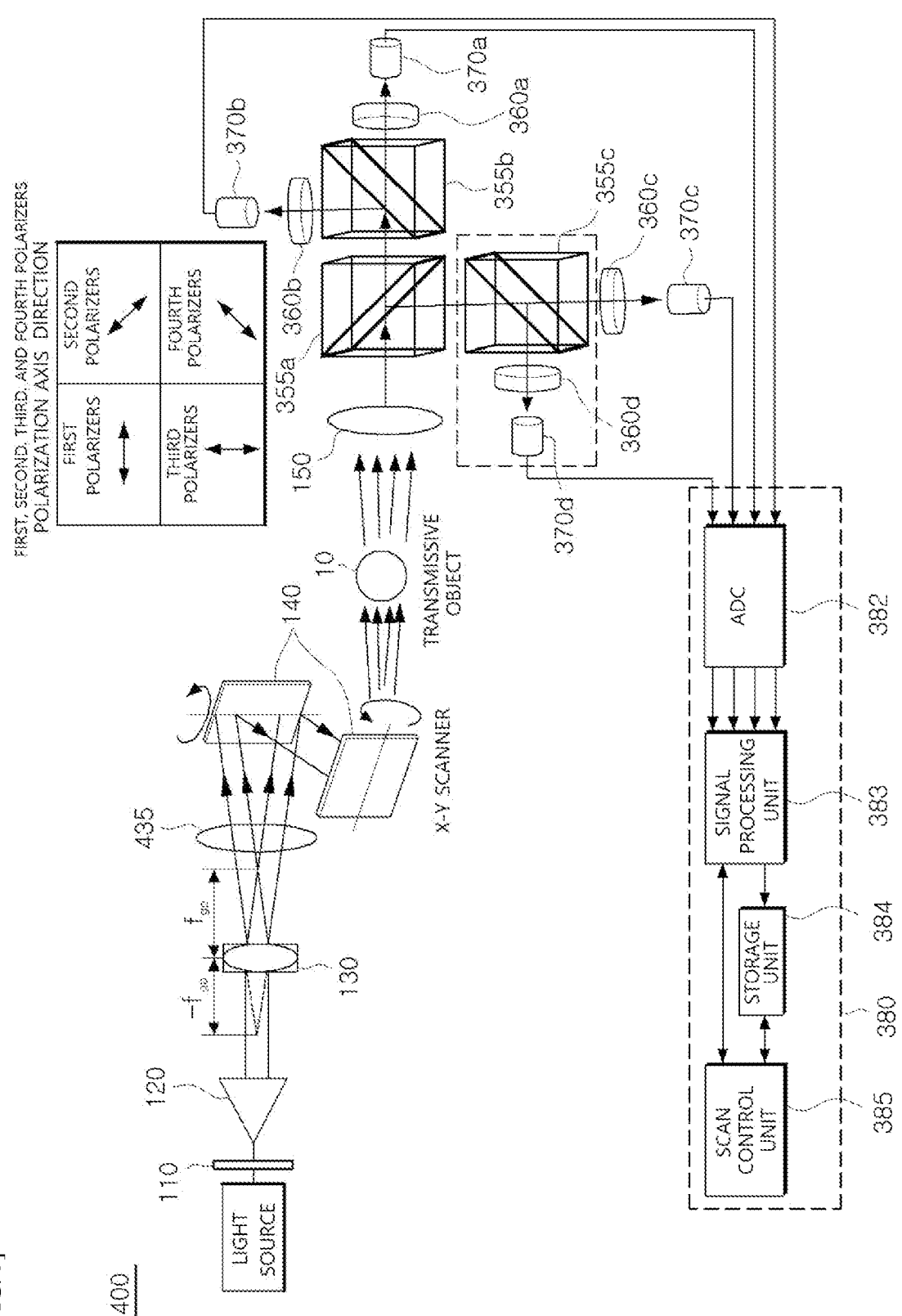

[FIG. 6]

[FIG. 7]
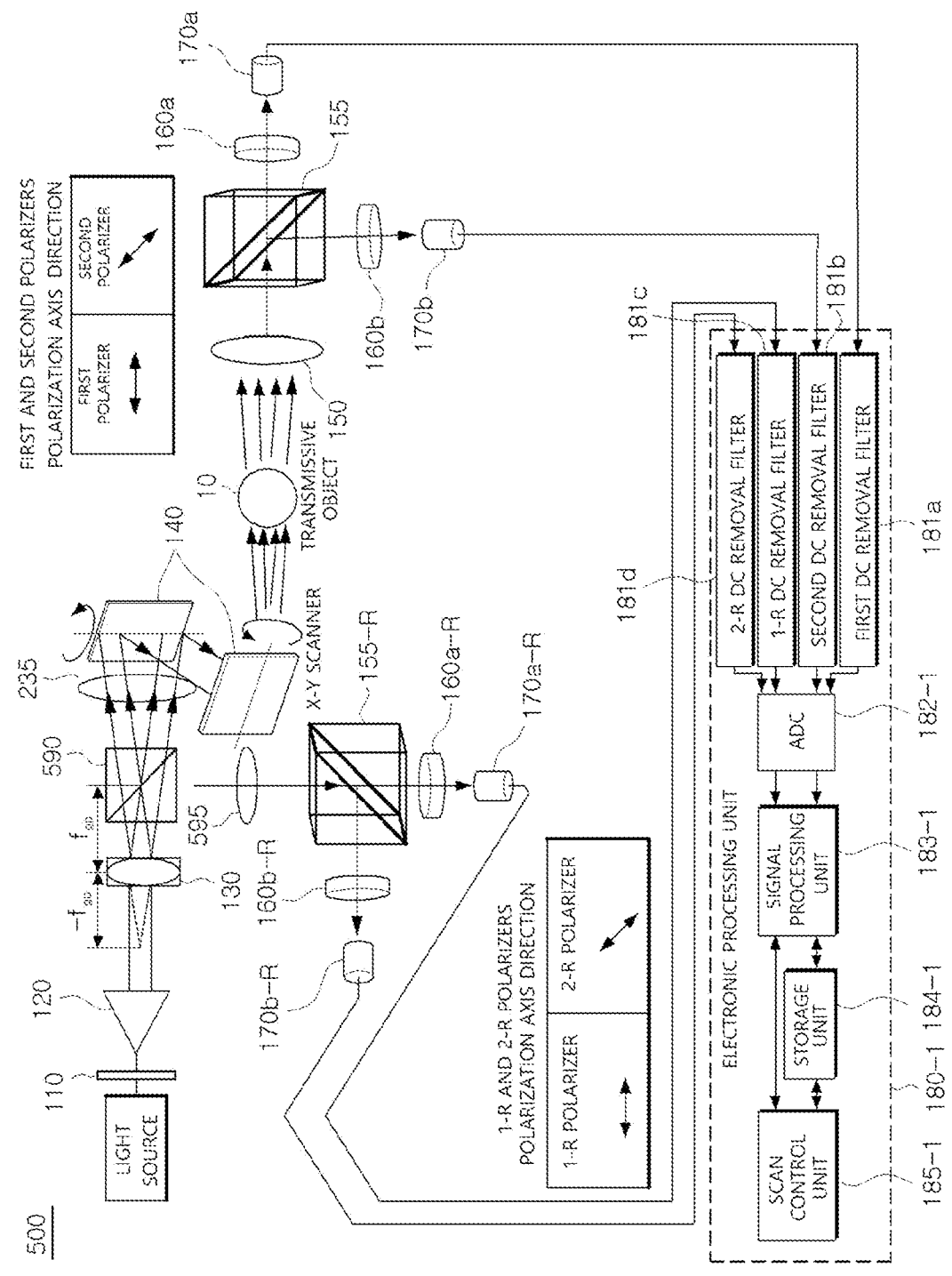

[FIG. 8]
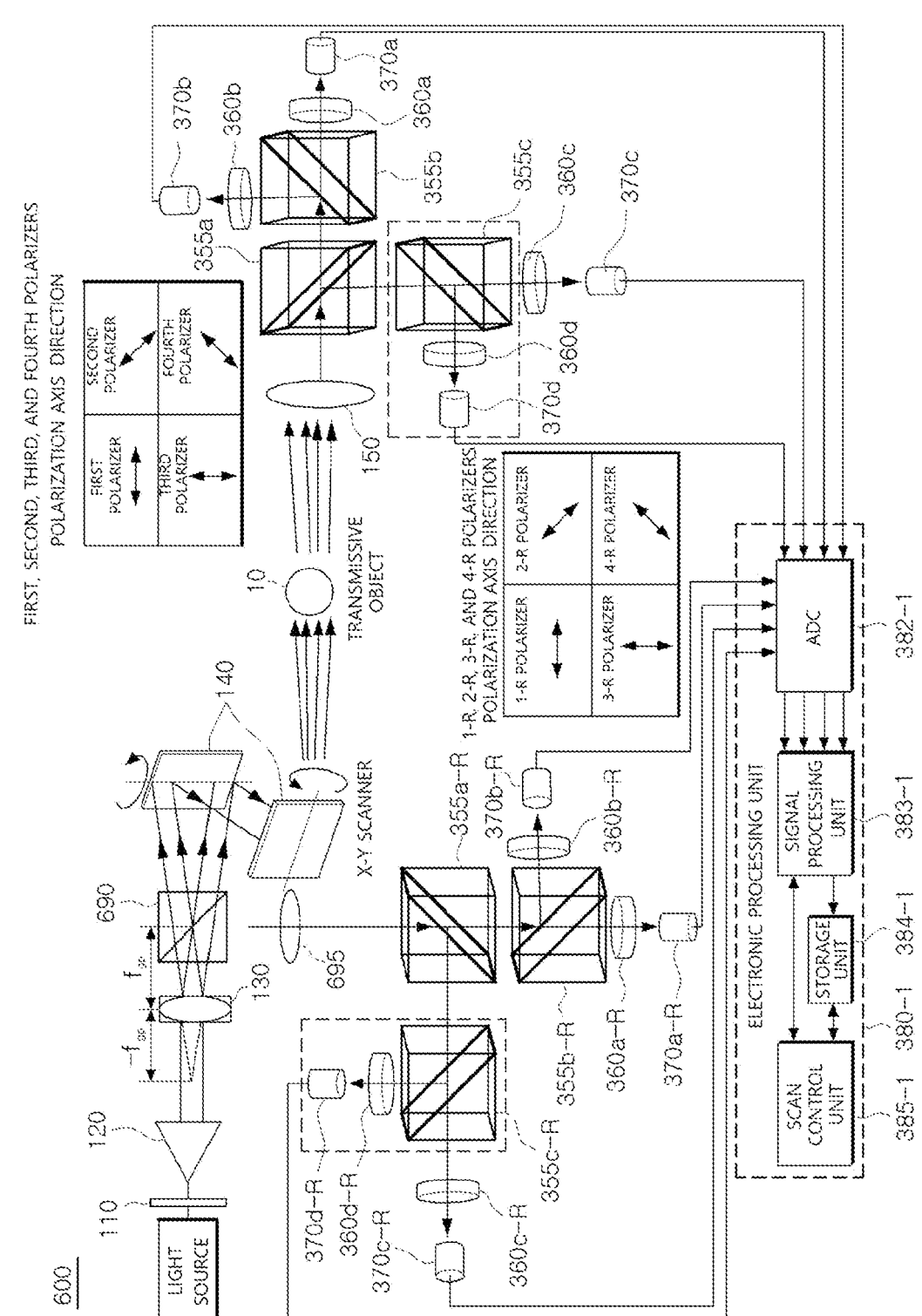

Figure 9:
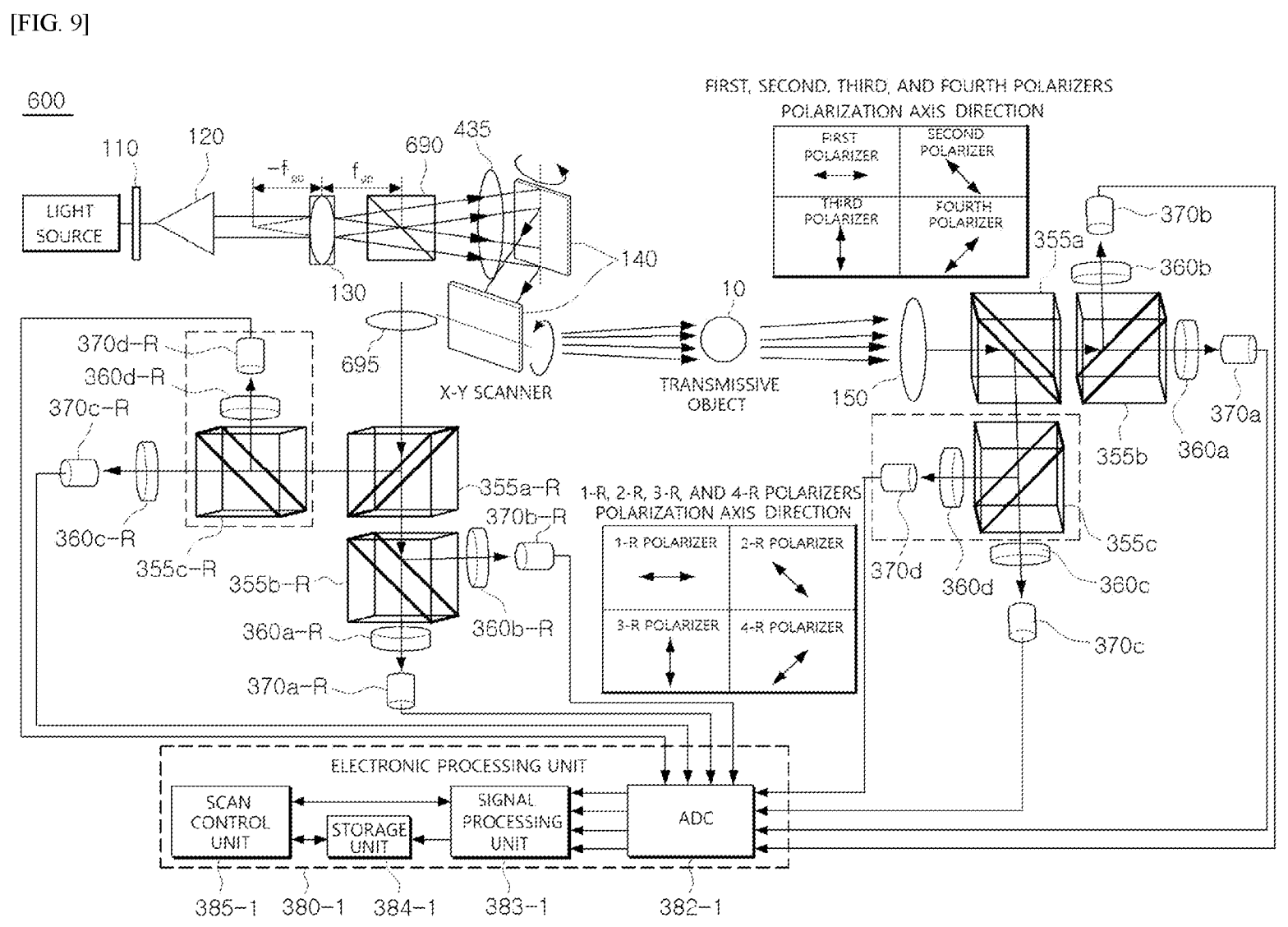

FIRST, SECOND, THIRD, AND FOURTH POLARIZERS
POLARIZATION AXIS DIRECTION

| SECOND POLARIZER | |
| --- | --- |
| FIRST POLARIZER | FOURTH POLARIZER |
| THIRD POLARIZER | |

1-R, 2-R, 3-R AND 4-R POLARIZERS
POLARIZATION AXIS DIRECTION

| 2-R POLARIZER | 4-R POLARIZER |
| --- | --- |
| 1-R POLARIZER | 3-R POLARIZER |

LIGHT SOURCE

TRANSMISSIVE OBJECT

X-Y SCANNER

ELECTRONIC PROCESSING UNIT

SCAN CONTROL UNIT   STORAGE UNIT   SIGNAL PROCESSING UNIT   ADC

GEOMETRIC PHASE IN-LINE SCANNING HOLOGRAPHY SYSTEM FOR TRANSMISSIVE OBJECT

CROSS REFERENCE TO PRIOR APPLICATIONS

This application is the 35 U.S.C. 371 national stage of International application PCT/KR2021/009102 filed on Jul. 15, 2021; which claims priority to Korean Patent Application No. 10-2020-0100457 filed Aug. 11, 2020. The entire contents of each of the above-identified applications are hereby incorporated by reference.

TECHNICAL FIELD

The present invention relates to a geometric phase in-line scanning holography system for a transmissive object, and more particularly, to a geometric phase in-line scanning holography system for a transmissive object, capable of realizing high-efficiency and high-quality optical scanning holography on a transmissive object by using a polarization sensitive lens and a geometric phase structure.

BACKGROUND ART

A conventional optical scanning-based object hologram acquisition apparatus forms a scanning beam pattern by using an interferometric structure that spatially splits coherent light into a first beam and a second beam, performs temporally and spatially optical modulation on the first beam and the second beam traveling along individual optical paths on the individual optical paths, and combines the first beam and the beam again.

However, in the case of the related art, in order to form a scanning pattern, an optical path difference due to the two split optical paths has to be shorter than a coherence length of coherent light. Accordingly, there is a need for a light source with high coherence and a device with high accuracy and stability in wavelength unit of light.

In addition, in the case of a conventional optical scanning method, in order to obtain a hologram of a real object without twin image noise and background noise, there is a need for an additional and complicated modulation device, such as an acoustic optical modulator or an electron optical modulator, which modulates the phase of light according to an electrical signal generated by a function generator.

However, since the acoustic optical modulator is bulky, requires a high-frequency signal generation device in a MHz band, and needs to generate high-energy sound waves, there is a disadvantage in that power loss of the acoustic optical modulator is large. In addition, there is a disadvantage in that the electron optical modulator is bulky, requires a voltage amplifier for generating a high voltage, and has a high complexity of the device.

These problems act as the biggest obstacle in the practical use of existing optical scanning holograms.

The background technology of the present invention is disclosed in Korean Patent Laid-Open No. 2013-0081127 (published on Jul. 16, 2013).

DISCLOSURE

Technical Problem

The present invention aims to provide a geometric phase in-line scanning hologram system that has high stability and low complexity since a scanning pattern is formed on a single optical path by using a polarization sensitive lens, and can obtain a complex hologram of a real transmissive object, from which twin image noise and background noise are removed, without a complicated modulation device by using a geometric phase detection method.

Technical Solution

The present invention provides a geometric phase in-line scanning holography system for a transmissive object, including: a polarization sensitive lens which receives a linearly polarized beam to generate a first spherical wave of right-handed circularly polarized light having a negative focal distance and a second spherical wave of left-handed circularly polarized light having a positive focal distance; a scan means which scans the transmissive object by using an interference beam generated between the generated first and second spherical waves; a first beam splitter which receives a beam having been transmitted through the transmissive object and splits the received beam into first and second output beams: first and second polarizers which polarize the first and second output beams, respectively; and first and second photodetectors which detect output beams having passed through the first and second polarizers.

The present invention provides a geometric phase in-line scanning holography system for a transmissive object, including: a polarization sensitive lens which receives a linearly polarized beam to generate a first spherical wave of right-handed circularly polarized light having a negative focal distance and a second spherical wave of left-handed circularly polarized light having a positive focal distance; a scan means which scans the transmissive object by using an interference beam generated between the generated first and second spherical waves: a first beam splitter which receives a beam having been transmitted through the transmissive object and splits the received beam into first and second output beams; a second beam splitter which splits the first output beam into $1a$ and $1b$ output beams; a third beam splitter which splits the second output beam into $2a$ and $2b$ output beams; first and second polarizers which polarize the $1a$ and $1b$ output beams, respectively; third to fourth polarizers which polarize the $2a$ and $2b$ output beams, respectively; and first to fourth photodetectors which detect output beams having passed through the first to fourth polarizers.

The present invention provides a geometric phase in-line scanning holography system for a transmissive object, including: a polarization sensitive lens which receives a linearly polarized beam to generate a first spherical wave of right-handed circularly polarized light having a negative focal distance and a second spherical wave of left-handed circularly polarized light having a positive focal distance; a scan means which scans the transmissive object by using an interference beam generated between the generated first and second spherical waves; a first beam splitter which receives a beam having been transmitted through the transmissive object and splits the received beam into first and second output beams; a second beam splitter which splits the first output beam into $1a$ and $1b$ output beams; first and second polarizers which polarize the $1a$ and $1b$ output beams, respectively; a third polarizer which polarizes the second output beam; and first to third photodetectors which detect output beams having passed through the first to third polarizers.

In addition, the polarization sensitive lens may include a geometric phase lens.

The geometric phase in-line scanning holography system may further include a light source-side polarizer which generates a linearly polarized beam from an input light source and provides the generated linearly polarized beam to the polarization sensitive lens.

In addition, the interference beam may be defined by the following equation in the form of a geometric phase Fresnel zone plate:

$$I_{GP-FZP}(x_0, y_0; z) = \cos\left[\frac{2\pi f_{gp}}{\lambda(2f_{gp}+z)z}(x_0^2 + y_0^2) + 2\theta\right]$$

wherein $I_{GP-FZP}(x_0, y_0; z)$ represents the interference beam of the first and second spherical waves formed by the polarization sensitive lens, $\lambda$ represents a wavelength of the beam used, $f_{gp}$ is a focal distance of the polarization sensitive lens, $(x_0^2 + y_0^2)$ represents a Cartersian coordinate system in which $(x_0, y_0)$ is a plane orthogonal to an optical axis of the linearly polarized beam, z represents a distance from the focal position of the second spherical wave to the object, and $\theta$ represents a clockwise linearly polarized angle with respect to the polarization axis of the light source-side polarizer that generates the linearly polarized beam from the light source and provides the generated linearly polarized beam.

In addition, the geometric phase in-line scanning holography system may further include a first lens which is installed between the polarization sensitive lens and the scan means and which adjusts a distance between focal points of the first and second spherical waves and images a pattern of a surface of the polarization sensitive lens to a surface of an object area, wherein the interference beam is defined by the following equation in the form of a geometric phase Fresnel zone plate:

$$I(x_0, y_0; z_{img}) = \cos\left[\frac{2\pi M_{img}^2 f_{gp}}{\lambda(2M_{img}^2 f_{gp} + z_{img})z_{img}}(M_{img}^2 x_0^2 + M_{img}^2 y_0^2) + 2\theta\right] + dc$$

or $$I(x_0, y_0; z_{img}) = \cos\left[\frac{2\pi M_{img}^2 f_{gp}}{\lambda(z_{img}^2 - M_{img}^2 f_{gp})}(M_{img}^2 x_0^2 + M_{img}^2 y_0^2) + 2\theta\right] + dc$$

wherein, $I(x_0, y_0; z_{img})$ represents the interference beam of the first and second spherical waves imaged on the object area by the first lens, $M_{img}$ represents the zooming-in or zooming-out ratio of the image by the first lens when imaging the pattern on the surface of the polarization sensitive lens to the surface of the object area, $z_{img}$ represents the distance from the focal position of the second spherical wave to the object, $2M_{img}^2 f_{gp}$ represents the distance between the focal points of the adjusted first and second spherical waves, and de represents a de bias component.

In addition, the geometric phase in-line scanning holography system may further include a second lens which is installed between the polarization sensitive lens and the scan means and which has a same focal position as the second spherical wave and converting the second spherical wave into a plane wave, wherein the interference beam is defined by the following equation in the form of a linear Fresnel zone plate formed by interference between the first spherical wave and the plane wave:

$$I(x_0, y_0; z) = \cos\left[\frac{\pi}{\lambda z}(x_0^2 + y_0^2) + 2\theta\right] + dc$$

wherein, $I(x_0, y_0; z)$ represents the interference beam of the first spherical wave and the plane wave transferred by the second lens, z represents the distance from the focal position of the first spherical wave, to which a curvature is added by the second lens, to the object, and de represents a direct current bias component.

In addition, the first beam splitter may transmit a part of an incident beam and reflect a part of the incident beam to split the incident beam into two beams, and the second polarizer may have a polarization direction rotated clockwise by 45 degrees with respect to a polarization direction of the first polarizer.

In addition, each of the beam splitters may transmit a part of incident beam and reflect a part of the incident beam to split the incident beam into two beams, and the second to fourth polarizers may have a polarization direction rotated clockwise by 45 degrees, 90 degrees, or 135 degrees with respect to a polarization direction of the first polarizer.

In addition, the geometric phase in-line scanning holography system may further include an electronic processing unit which generates a complex hologram of the object by processing first and second current signals detected by the first and second photodetectors, wherein the first and second photodetectors may generate the first and second current signals corresponding to intensities of the first and second output beams passing through the first and second polarizers, respectively.

In addition, the first and second current signals $$\left(I_0^{dc}(x, y), I_0^{dc}(x, y)\right)$$

generated by the first and second photodetectors may be defined by the following equation:

$$I_0^{dc}(x, y) = \int O(x_0, y_0; z) \otimes \left\{\cos\left[\frac{2\pi f_{gp}}{\lambda(2f_{gp}+z)z}(x_0^2 + y_0^2)\right] + dc\right\}dz$$

$$I_{\pi/2}^{dc}(x, y) = \int O(x_0, y_0; z) \otimes \left\{\cos\left[\frac{2\pi f_{gp}}{\lambda(2f_{gp}+z)z}(x_0^2 + y_0^2) + \frac{\pi}{2}\right] + dc\right\}dz$$

wherein $O(x_0, y_0; z)$ represents a three-dimensional image of the object as a three-dimensional distribution for transmittance of the object, $\otimes$ represents a convolution operation, $\lambda$ represents a wavelength of the beam used, $(x, y)$ represents a scan position of a scan beam designated by the scan means, $f_{gp}$ represents a focal distance of the polarization sensitive lens, $(x_0^2 + y_0^2)$ represents a Cartersian coordinate system in which $(x_0, y_0)$ is a plane orthogonal to an optical axis of the linearly polarized beam, z represents a distance from the focal position of the second spherical wave to the object, and dc represents a dc bias component.

In addition, the electronic processing unit may include: first and second dc removal filters which remove a de component, which is a direct current bias component, from the first and second current signals and input the first and second current signals, from which the dc component is removed, to an AD converter; the AD converter which converts the first and second current signals, from which the dc component is filtered, into digital signals; a signal processing unit which generates a complex hologram of the object from the converted digital signals; a storage unit which stores the complex hologram; and a scan control unit which generates a control signal for changing a position of the scan means whenever hologram processing is completed for an arbitrary position of the object.

In addition, the geometric phase in-line scanning holography system may further include: a second beam splitter which is installed between the polarization sensitive lens and the scan means and which transmits a part of the incident interference beam to the scan means, and reflects a part of the incident interference beam and splits the incident interference beam into two beams; and a 1-R beam splitter, 1-R and 2-R polarizers, and 1-R and 2-R photodetectors which process the beam reflected by the second beam splitter and which are disposed to be symmetrical with the first beam splitter, the first and second polarizers, and the first and second photodetectors, respectively, wherein the electronic processing unit may further include 1-R and 2-R dc removal filters which use 1-R and 2-R current signals detected by the 1-R and 2-R photodetectors as first and second phase correction reference signals for compensating for phase fluctuation caused by vibration of the system and remove a dc component, which is a direct current bias component, from the first and second phase correction reference signals, respectively, and the electronic processing unit may convert the first and second phase correction reference signals, from which the dc component is removed, into digital signals to generate a complex hologram for phase correction, and correct the phase fluctuation of the system by multiplying a complex conjugate of the complex hologram for the phase correction by the complex hologram of the object stored in the storage unit.

In addition, the geometric phase in-line scanning holography system may further include an electronic processing unit which generates a complex hologram of the object by processing first to fourth current signals detected by the first to fourth photodetectors, wherein the first to fourth photodetectors may generate the first to fourth current signals corresponding to intensities of the output beams passing through the first to fourth polarizers, respectively.

In addition, an $n^{th}$ current signal ($I_{p_n}(x, y)$) generated by the first to fourth photodetectors may be defined by the following equation:

$$I_{p_n}(x, y) = \int O(x_0, y_0; z) \otimes \left[ \cos\left( \frac{2\pi f_{gp}}{\lambda(2f_{gp} + z)z}(x_0^2 + y_0^2) + p_n \right) \right] dz,$$

$$p_n = \left\{ 0, \frac{\pi}{2}, \pi, \frac{3\pi}{2} \right\}$$

wherein n={1,2,3,4}, $p_n$ is a shifted phase of a hologram signal generated by a photodetector designated as n, $O(x_0, y_0; z)$ represents a three-dimensional image of the object as a three-dimensional distribution for transmittance of the object, $\otimes$ represents a convolution operation, $\lambda$ represents a wavelength of the beam used, (x, y) represents a scan position of a scan beam designated by the scan means, $f_{gp}$ represents a focal distance of the polarization sensitive lens, $(x_0^2+y_0^2)$ represents a Cartersian coordinate system in which $(x_0,y_0)$ is a plane orthogonal to an optical axis of the linearly polarized beam, and z represents a distance from a focal position of the second spherical wave to the object.

In addition, the electronic processing unit may include: an AD converter which converts the first to fourth current signals into digital signals; a signal processing unit which generates a complex hologram of the object from the converted digital signals; a storage unit which stores the complex hologram; and a scan control unit which generates a control signal for changing a position of the scan means whenever hologram processing is completed for an arbitrary position of the object.

In addition, the geometric phase in-line scanning holography system may further include: fourth beam splitter which is installed between the polarization sensitive lens and the scan means and which transmits a part of the incident interference beam to the scan means, and reflects a part of the incident interference beam and splits the incident interference beam into two beams; and 1-R to 3-R beam splitters, 1-R to 4-R polarizers, and 1-R to 4-R photodetectors which process the beam reflected by the fourth beam splitter and which are disposed to be symmetrical with the first to third beam splitters, the first to fourth polarizers, and the first to fourth photodetectors, respectively, wherein the electronic processing unit may use 1-R to 4-R current signals detected by the 1-R to 4-R photodetectors as first to fourth phase correction reference signals for compensating for phase fluctuation caused by vibration of the system, convert the first to fourth phase correction reference signals into digital signals to generate a complex hologram for phase correction, and correct the phase fluctuation of the system by multiplying the complex hologram for the phase correction by the complex hologram of the object stored in the storage unit.

Advantageous Effects

According to the present invention, since a scanning pattern is formed on a single optical path by using a polarization sensitive lens, it is possible to obtain a complex hologram of a real object, from which twin image noise and background noise are removed, without a complicated modulation device by using a geometric structure with high stability and low complexity according to polarization, and high-efficiency and high-quality optical scanning holography may be implemented for a transmissive object.

In particular, since a complicated optical modulation device for modulating an optical signal is not required, the present invention may reduce the complexity of the structure, may achieve miniaturization and weight reduction, and may apply to mobile devices that are sensitive to energy consumption.

DESCRIPTION OF DRAWINGS

FIG. 1 is a diagram illustrating a first embodiment of a geometric phase in-line scanning holography system according to the present invention.

FIG. 2 is a diagram explaining a principle of a polarization sensitive lens according to an embodiment of the present invention.

FIG. 3 is a diagram illustrating a second embodiment of a geometric phase in-line scanning holography system according to the present invention.

FIG. 4 is a diagram illustrating a third embodiment of a geometric phase in-line scanning holography system according to the present invention.

FIG. 5 is a diagram illustrating a fourth embodiment of a geometric phase in-line scanning holography system according to the present invention.

FIG. 6 is a diagram illustrating a fifth embodiment of a geometric phase in-line scanning holography system according to the present invention.

FIG. 7 is a diagram illustrating a modification of FIG. 6.

FIG. 8 is a diagram illustrating a sixth embodiment of a geometric phase in-line scanning holography system according to the present invention.

FIG. 9 is a diagram illustrating a modification of FIG. 8.

MODES OF THE INVENTION

Hereinafter, embodiments of the present invention will be described in detail with reference to the accompanying drawings, so that those of ordinary skill in the art to which the present invention belongs may easily carry out the present invention.

The present invention relates to a geometric phase in-line scanning holography system for an object, and proposes a geometric phase in-line scanning holography system for obtaining a hologram of a transmissive object.

FIG. 1 is a diagram illustrating a first embodiment of a geometric phase in-line scanning holography system according to the present invention.

As illustrated in FIG. 1, a geometric phase in-line scanning holography system 100 according to a first embodiment includes a polarizer 110, a collimator 120, a polarization sensitive lens 130, a scan means 140, a concentrator 150, a first beam splitter 155, first and second polarizers 160a and 160b, first and second photodetectors 170a and 170b, and an electronic processing unit 180.

First, a light source generates electromagnetic waves. In an embodiment of the present invention, as the light source, a variety of means, such as a laser generator for outputting coherent light, a light emitting diode (LED) lamp with low coherence, or a halogen lamp with a short coherence length, may be used.

The polarizer 110 (linear polarizer) converts the input light source into a linearly polarized beam (linearly polarized light) and provides the linearly polarized beam to the collimator 120. In FIG. 1, the light source and the polarizer 110 may be omitted. In this case, linearly polarized beam generated from the outside may be directly input to the collimator 120. In addition, when the light source is omitted in FIG. 1, a light source provided from the outside may be directly input to the polarizer 110.

The collimator 120 expands the beam output from the polarizer 110 and transfers the expanded beam to the polarization sensitive lens 130, and may be implemented with a variety of means capable of expanding the beam.

The polarization sensitive lens 130 receives the expanded linearly polarized beam through the collimator 120 and simultaneously generates a first spherical wave of right-handed circularly polarized light having a negative focal distance and a second spherical wave of left-handed circularly polarized light having a positive focal distance.

Here, the polarization sensitive lens 130 may be configured with a geometric phase lens. The polarization sensitive lens 130 has a thin planar structure having a Pancharatnam-phase effect based on liquid crystal, and acts as a lens that changes a wavefront of an input beam into wavefronts with positive and negative focal distances according to the polarization of the input light. The geometric phase lens may be manufactured by using a Mach-Zehnder interferometer-based analog hologram recording device, as is well known. For example, an off-the-shelf product provided by ImagineOptix may be used.

FIG. 2 is a diagram explaining the principle of the polarization sensitive lens according to an embodiment of the present invention.

As illustrated in (a) of FIG. 2, when a right-handed circularly polarized beam is incident, the geometric phase lens (polarization sensitive lens) 130 responds to the corresponding polarization direction and acts as a convex lens to generate a spherical wave of left-handed circularly polarized light (beam) having a positive focal distance ($+f_{gp}$). As illustrated in (b) of FIG. 2, when a left-handed circularly polarized beam is incident, the geometric phase lens (polarization sensitive lens) 130 reacts to the corresponding polarization direction and acts as a concave lens to generate a spherical wave of right-handed circularly polarized light (beam) having a negative focal distance ($-f_{gp}$).

However, in the case of the embodiment of the present invention, as illustrated in (c) of FIG. 2, a linearly polarized wavefront is input to the geometric phase lens. In this case, the geometric phase lens divides energy intensity of input light by almost half to simultaneously generate a spherical wave (hereinafter, a first spherical wave) of right-handed circularly polarized light having a negative focal distance ($-f_{gp}$) and a spherical wave (hereinafter, a second spherical wave) of left-handed circularly polarized light having a positive focal distance ($+f_{gp}$).

| As such, the polarization sensitive lens 130 changes a part of the incident linearly polarized beam to right-handed circularly polarized light to form a first spherical wave that places a focus on the opposite side of the traveling direction of the incident beam, and at the same time, changes the other thereof to left-handed circularly polarized light to form a second spherical wave that places a focus on the traveling direction of the incident beam.

As such, in the embodiment of the present invention, the scanning pattern is formed on the single optical path by using the polarization sensitive lens. Compared to a conventional technique in which a light source is divided into two paths and then recombined to form an interference pattern, it is possible to implement high-efficiency and high-quality light scanning holography. In addition, there is an advantage of being robust and stable in external environments by using an optical system structure with high stability and low complexity.

The first and second spherical waves derived in-line from the polarization sensitive lens 130 are transferred to the scan means 140. Here, the first spherical wave and the second spherical wave overlap each other on the in-line structure to form an interference beam.

The scan means 140 scans the transmissive object 10 by using the interference beam generated between the first and second spherical waves.

Here, the transmissive object 10 may correspond to various objects having permeability, such as cells, microorganisms, films, and transparent objects or sculptures. Hereinafter, the transmissive object 10, which is an object to be photographed, is referred to as an object.

At this time, the interference beam may be defined by Equation 1 below in the form of a geometric phase Fresnel zone plate.

$$I_{GP-FZP}(x_0, y_0; z) = \cos\left[\frac{2\pi f_{gp}}{\lambda(2f_{gp} + z)z}(x_0^2 + y_0^2) + 2\theta\right] \quad \text{[Equation 1]}$$

Here, $I_{GP-FZP}(x_0, y_0; z)$ represents the interference beam of the first and second spherical waves formed by the polarization sensitive lens 140, $\lambda$ represents the wavelength of the beam used, $f_{gp}$ is the focal distance of the polarization sensitive lens 140, $(x_0^2 + y_0^2)$ represents a Cartersian coordinate system in which $(x_0, y_0)$ is the plane orthogonal to the optical axis of the linearly polarized beam, z represents the distance from the focal position of the second spherical
wave to the object 10, and θ represents the clockwise
linearly polarized angle with respect to the polarization axis
of the polarizer 110.

That is, the interference pattern of an axially linearly
polarized part having an angle of θ clockwise with respect
to the polarization axis of the polarizer 110 among the first
spherical wave and the second spherical wave generated
through the polarization sensitive lens 140 of FIG. 1
becomes a nonlinear Fresnel zone plate with the phase
shifted by 2θ. At this time, since the phase of the interference
pattern is shifted by the geometric rotation angle of the
polarization axis, this shape is called a geometrical phase
Fresnel zone plate.

The scan means 140 scans the transmissive object 10 by
using the interference beam received from the polarization
sensitive lens 130. The scan means 140 scans the transmis-
sive object 10, which is the object to be photographed, by
using the interference beam as a response command beam.

The intensity pattern of the response command beam for scanning the object 10 may be defined as in Equation 2.

$$I(x_0, y_0; z) = I_{GP-FZP}(x_0, y_0; z) + dc \qquad \text{[Equation 2]}$$

$$= \cos\left[\frac{2\pi f_{gp}}{\lambda(2f_{gp}+z)z}(x_0^2 + y_0^2) + 2\theta\right] + dc$$

Here, dc is the sum of the spherical wave intensity pattern
and the spherical wave intensity pattern and is a direct
current bias component that does not change with space in
an ideal case and has a very small change with space even
in an actual case.

In the present embodiment, the scan means 140 uses a
mirror scanner. The mirror scanner includes an X-Y scanner
having a horizontal scan mirror that scans the object 10 in
the X direction and a vertical scan mirror that scans the
object 10 in the Y direction. Of course, in the case of the
present invention, the scan means 140 is not limited to the
mirror scanner, and similar means or other known scan
means may be used.

In an embodiment of the present invention, a beam in
which the right-handed circularly polarized spherical wave
and the left-handed circularly polarized spherical wave
overlap each other is transferred to the mirror-shaped scan
means 140, and the scan means 140 may scan the object
while moving the geometric phase Fresnel zone plate across
the object 10.

The scan means 140 is operated by receiving a scanning
control signal from a scan control unit 185 provided in the
electronic processing unit 180, and the scan control unit 185
generates the scanning control signal for controlling the
scanning position of the scan means 140. Here, the scanning
control signal may include a horizontal scan signal and a
vertical scan signal for controlling the horizontal scan mirror
and the vertical scan mirror in the horizontal direction and
the vertical direction, respectively.

Of course, instead of using the mirror scanner, the object
may be scanned by placing the object on an object plate and
horizontally moving the object plate. In addition, in the
present invention, the object may be scanned by using
various methods such as using an electro-optic deflector.

The beam transmitted through the object 10 at the scan
position of the scan beam designated by the scan means 140
is spatially integrated by the concentrator 150. As described
above, since the object 10 corresponds to the transmissive
object having light transmission, the beam transmitted through the transmissive object in the light path (rear side of
the transmissive object) passing through the transmissive
object is incident on the concentrator 150 and is integrated.

Here, the concentrator 150 may be implemented through
a lens, and may also be implemented by various well-known
concentrating means such as an imaging or non-imaging
concentrator including a concave reflector.

The beam concentrated by the concentrator 150 after
passing through the object 10 is transferred to the first beam
splitter 155. The first beam splitter 155 receives the con-
centrated beam from the concentrator 150 and splits the
concentrated beam into first and second output beams. The
first beam splitter 155 transmits a part of the light concen-
trated by the concentrator 150 and transfers the part of the
light to the first polarizer 160a, and reflects a part of the light
and transfers the part of the light to the second polarizer
160b. That is, the passed first output beam is transferred to
the first polarizer 160a and the reflected second output beam
is transferred to the second polarizer 160b.

The first and second polarizers 160a and 160b polarize the
received first and second output beams, respectively. Here,
the second polarizer 160b is positioned in a polarization
direction rotated clockwise by 45 degrees relative to the
polarization direction of the first polarizer 160a.

The first polarizer 160a transmits the polarized beam in
the polarization direction of the first polarizer 160a among
the first output beams received from the first beam splitter
155 and transfers the polarized beam to the first photode-
tector 170a. Similarly, the second polarizer 160b transmits
the polarized beam in the polarization direction of the
second polarizer 160b among the received second output
beams and transfers the polarized beam to the second
photodetector 170b.

The first and second photodetectors 170a and 170b are
installed to correspond to the first and second polarizers
160a and 160b, and detect the output beams passing through
the first and second polarizers 160a and 160b, respectively.

The first and second photodetectors 170a and 170b may
be implemented as photodiodes, but the present invention is
not necessarily limited thereto, and a variety of photodetec-
tion means such as a photo-multiplier tube may be applied.
In addition, it is possible to directly detect the light trans-
mitted to the detection surface of the photodetection means
without a concentrator.

The first and second photodetectors 170a and 170b detect
a polarized portion polarized in the direction of the first
polarizer 160a and a polarization portion polarized in the
direction of the second polarizer 160b among the beams
spatially integrated through the concentrator 150, and con-
verts the detected polarized portions into a current signal. A
current is generated according to the intensity of the polar-
ization portion.

That is, the first and second photodetectors 170a and 170b
generate first and second current signals to correspond to the
intensities of the first and second output beams passing
through the first and second polarizers 160a and 160b,
respectively.

The first current signal generated by the first photodetec-
tor 170a with respect to the scan position of the scan beam
designated by the scan means 140 corresponds to a pattern
in which a three-dimensional image distribution of the
object and the geometric phase Fresnel zone plate in the
direction of the first polarizer is encoded, and the second
current signal generated by the second photodetector 170b
corresponds to a pattern in which a three-dimensional image distribution of the object and the geometric phase Fresnel zone plate in the direction of the second polarizer is encoded.

The polarization direction of the second polarizer 160*b* is rotated clockwise by 45 degrees relative to the polarization direction of the first polarizer 160*a*. Therefore, the first and second current signals $$I_0^{dc}(x, y) \text{ and } I_{\pi/2}^{dc}(x, y)$$

respectively generated by the first and second photodetectors 170*a* and 170*b* may be defined as in Equations 3 and 4, based on the polarization direction of the first polarizer 160*a*.

$$I_0^{dc}(x, y) = \qquad\qquad\qquad\qquad\qquad\qquad\text{[Equation 3]}$$
$$\int O(x_0, y_0; z) \otimes \left\{ \cos\left[ \frac{2\pi f_{gp}}{\lambda(2f_{gp} + z)z} (x_0^2 + y_0^2) \right] + \mathrm{dc} \right\} dz$$

$$I_{\pi/2}^{dc}(x, y) = \qquad\qquad\qquad\qquad\qquad\text{[Equation 4]}$$
$$\int O(x_0, y_0; z) \otimes \left\{ \cos\left[ \frac{2\pi f_{gp}}{\lambda(2f_{gp} + z)z} (x_0^2 + y_0^2) + \frac{\pi}{2} \right] + \mathrm{dc} \right\} dz$$

Here, $O(x_0, y_0; z)$ represents the three-dimensional image of the object 10 as a three-dimensional distribution for the transmittance of the object 10, $\otimes$ represents a convolution operation, $\lambda$ represents the wavelength of the beam used, $(x, y)$ represents the scan position of the scan beam designated by the scan means, $f_{gp}$ represents the focal distance of the polarization sensitive lens, $(x_0^2 + y_0^2)$ represents a Cartersian coordinate system in which $(x_0, y_0)$ is the plane orthogonal to the optical axis of the linearly polarized beam, z represents the distance (depth position of the object) from the focal position of the second spherical wave to the object 10, and dc represents the dc bias component.

The first and second current signals according to Equations 3 and 4 are transferred to first and second dc removal filters 181*a* and 181*b* in the electronic processing unit 180, respectively.

The electronic processing unit 180 generates a complex hologram of the object 10 by processing the first and second current signals detected by the first and second photodetectors 170*a* and 170*b*, and includes the first and second dc removal filters 181*a* and 181*b*, an AD converter 182, a signal processing unit 183, a storage unit 184, and a scan control unit 185.

The first and second dc removal filters 181*a* and 181*b* remove a dc bias component, that is, a dc component, from the first and second current signals, respectively, and input the resulting signals to the AD converter 182.

The first and second dc removal filters 181*a* and 181*b* remove a portion in which a transmittance distribution of dc and the object in Equations 3 and 4 is convoluted, generates signals such as Equations 5 and 6 below as outputs, and transfers the signals to the AD converter 182.

$$I_0(x, y) = \int O(x_0, y_0; z) \otimes \cos\left[ \frac{2\pi f_{gp}}{\lambda(2f_{gp} + z)z} (x_0^2 + y_0^2) \right] dz \quad \text{[Equation 5]}$$

$$I_{\pi/2}(x, y) = \int O(x_0, y_0; z) \otimes \cos\left[ \frac{2\pi f_{gp}}{\lambda(2f_{gp} + z)z} (x_0^2 + y_0^2) \frac{\pi}{2} \right] dz \quad \text{[Equation 6]}$$

The AD converter 182 converts the first and second current signals, the dc components of which are filtered through the respective filters, into digital signals. The AD converter 182 has two input channels, receives the in-phase signal of Equation 5 and the π/2 phase signal of Equation 6 through the respective channels and converts the received signals into digital signals.

The signal processing unit 183 generates a complex hologram for a transmissive object from the converted digital signals, and the storage unit 184 stores the generated complex hologram.

In this case, the complex hologram may be defined as in Equation 7 below.

$$I_H(x, y) = I_0(x, y) - jI_{\pi/2}(x, y) = \qquad\qquad\text{[Equation 7]}$$
$$\int O(x_0, y_0; z) \otimes \cos\left[ j \frac{2\pi f_{gp}}{\lambda(2f_{gp} + z)z} (x_0^2 + y_0^2) \right] dz$$

Here, $I_0(x, y)$ represents a value of a state where the dc component is removed from $$I_0^{dc}(x, y),$$

and $I_{\pi/2}(x, y)$ represents s a value of a state where the dc component is removed from $$I_{\pi/2}^{dc}(x, y).$$

The scan control unit 185 generates a control signal for changing the position of the scan means 140 whenever hologram processing is completed for an arbitrary position of the object, and transfers the control signal to the scan means 140. The signal processing unit 183 adds Equations 5 and 6 by using a complex number addition method as in Equation 7 to form a two-dimensional array for each scan position, and the storage unit 184 stores the two-dimensional array.

Here, instead of omitting the first and second de removal filters 181*a* and 181*b*, the AD converter 182 receives the outputs of the first and second photodetectors 170*a* and 170*b*, converts the outputs of the first and second photodetectors 170*a* and 170*b* into digital signals, and performs dc removal filtering through a digital signal processing method.

In addition, the signal processing unit 183 may form two-dimensional arrays for each scan position with respect to Equations 5 and 6 and transfer the two-dimensional arrays to the storage unit 184. When the scan is finished, the signal processing unit 183 may read the two-dimensional arrays corresponding to Equations 5 and 6 from the storage unit 184 and add the two-dimensional arrays by the complex number addition method of Equation 7 and then store the result in the storage unit 184 again.

Figure 6:
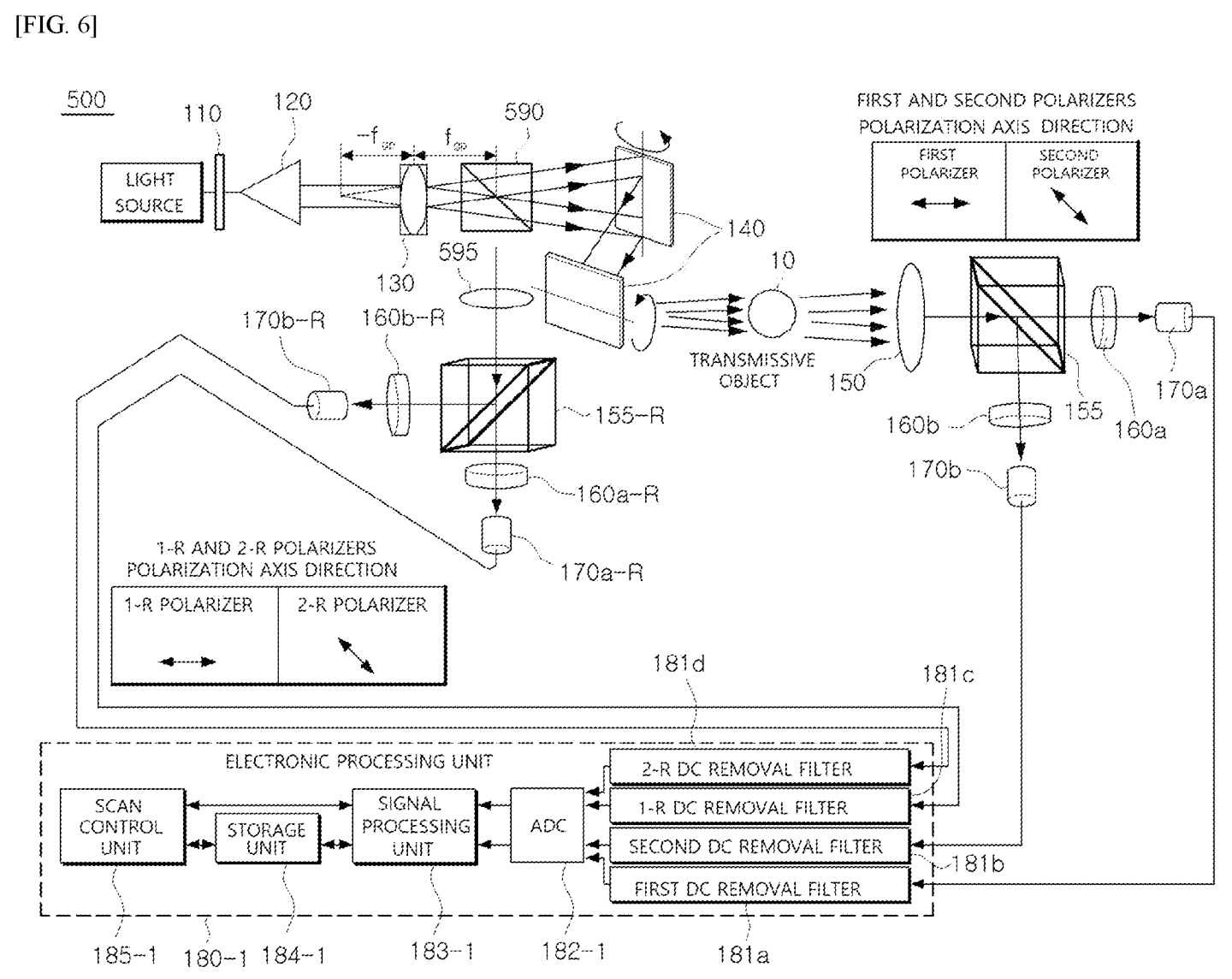

Here, Equation 7 is the same as a complex hologram obtained by using a conventional light scanning hologram. This means that the hologram of the same shape as the conventional hologram can be generated through an in-line structure without using a complicated optical modulator and without a complicated interferometer structure. The configuration of FIG. 1 may be applied to FIGS. 3, 6, and 7 later.

FIG. 3 is a diagram illustrating a second embodiment of a geometric phase in-line scanning holography system according to the present invention.

As illustrated in FIG. 3, a geometric phase in-line scanning holography system 200 according to a second embodiment includes a polarizer 110, a collimator 120, a polarization sensitive lens 130, a first lens 235, a scan means 140, a concentrator 150, a first beam splitter 155, first and second polarizers 160a and 160b, first and second photodetectors 170a and 170b, and an electronic processing unit 180.

FIG. 3 illustrates that the first lens 235 is additionally inserted into the structure of the first embodiment of FIG. 1, and a separate description of components denoted by the same reference numerals is omitted.

In FIG. 3, the first lens 235 is installed between the polarization sensitive lens 130 and the scan means 140 and acts as an imaging lens that adjusts the distance between the focal points of the first and second spherical waves and images the pattern of the surface of the polarization-sensitive lens to the surface of the object area.

That is, when the geometric phase lens surface is imaged on the area of the object in a zooming-in or zooming-out method by using the first lens 235, the pattern on the geometric phase lens surface may be imaged and projected onto the object.

When the focal position of the first spherical wave is f1 and the focal position of the second spherical wave is f2, the distance between f1 and f2 is $2f_{gp}$ in the case of FIG. 1. However, in the case of FIG. 3, the distance between f1 and f2 is changed to $2M^2_{img}f_{gp}$ according to the zooming-in or zooming-out ratio of the first lens 235.

In addition, in the case of FIG. 3, the interference beam is in the form of a geometric phase nonlinear Fresnel zone plate, and may be defined by Equation 8 below.

$$I(x_0, y_0; z_{img}) = \\ \cos\left[\frac{2\pi M^2_{img}f_{gp}}{\lambda\left(2M^2_{img}f_{gp} + z_{img}\right)z_{img}}\left(M^2_{img}x_0^2 + M^2_{img}y_0^2\right) + 2\theta\right] + \mathrm{dc}$$

[Equation 8]

Here, $I(x_0, y_0; z_{img})$ represents the interference beam of the first and second spherical waves imaged on the object area by the first lens 235, $M_{img}$ represents the zooming-in or zooming-out ratio of the image by the first lens 235 when imaging the pattern on the surface of the polarization sensitive lens (geometric phase lens) to the surface of the object area, $z_{img}$ represents the distance from the focal position of the second spherical wave to the object 10, $2M^2_{img}f_{gp}$ represents the distance between the focal points of the adjusted first and second spherical waves, and de represents the dc bias component.

By placing the first lens 235 between the polarization sensitive lens 130 and the object 10, new first and second spherical waves in which the distance between the focal points of two spherical waves is changed by the zooming-in or zooming-out method may be placed on the surface of the object.

The embodiments of the present invention described above illustrate that the object is placed in the area where the two spherical waves diverge. However, the object may also be placed between the focal points of the two spherical waves (the point between f1 and f2) by using a method for improving resolution in microscopic applications of heterodyne scanning-based holograms.

To this end, by placing the imaging lens between the polarization sensitive lens (geometric phase lens) and the object, it is possible to obtain a hologram of an object encoded by an interference pattern of a reverse curvature of a diverging spherical wave and a converging spherical wave by using a method of placing the focal position f1 of the first spherical wave on the front side of the object and placing the focal position f2 of the second spherical wave on the back side of the object. The resolution may be improved by restoring this numerically.

For example, by placing the imaging lens between the geometric phase lens and the object, it is possible to obtain the hologram encoded with the interference pattern of the converging first spherical wave and the diverging second spherical wave when the geometric phase lens surface is imaged on the object surface. In this case, the interference pattern may be defined as Equation 9 below.

$$I(x_0, y_0; z_{img}) = \\ \cos\left[\frac{2\pi M^2_{img}f_{gp}}{\lambda\left(z^2_{img} - M^4_{img}f^2_{gp}\right)}\left(M^2_{img}x_0^2 + M^2_{img}y_0^2\right) + 2\theta\right] + \mathrm{dc}$$

[Equation 9]

Here, $I(x_0, y_0; z_{img})$ represents the interference beam of the first and second spherical waves imaged on the object area by the first lens 235, $M_{img}$ represents the zooming-in or zooming-out ratio of the image by the imaging lens when imaging the pattern on the surface of the polarization sensitive lens (geometric phase lens) to the object surface, $z_{img}$ represents the distance from the focal position of the second spherical wave to the object 10, and dc represents the dc bias component.

In addition, in an embodiment of the present invention, an interference pattern between a plane wave and a spherical wave may be formed by placing a second lens (not illustrated) between the polarization sensitive lens 130 and the scan means 140.

In general, in optical scanning holography, a hologram of an object is obtained by scanning an object with a linear Fresnel zone plate in which a spherical wave and a plane wave interfere with each other. When the lens is placed between the geometric phase lens and the object, the interference pattern of the plane wave and the spherical wave may be formed. Therefore, the hologram encoded with the linear Fresnel zone plate, which is the interference pattern formed by the interference of the spherical wave and the plane wave, may be obtained.

A detailed description thereof is as follows. At this time, for convenience of explanation, it is assumed that the second lens instead of the first lens is disposed at reference numeral 235 of FIG. 3.

The second lens (not illustrated) is disposed between the polarization sensitive lens 130 and the scan means 140 so as to form a focus at the same focal position f2 as that of the second spherical wave. As described above, when the focal position of the second lens (not illustrated) is the same as the focal position of the second spherical wave, the second spherical wave is converted into the plane wave, and the curvature of the first spherical wave is added by the second lens.

In this case, the interference beam may be defined as Equation 10 below in the form of a linear Fresnel zone plate formed by the interference between the first spherical wave and the plane wave.

$$I(x_0, y_0; z) = \cos\left[\frac{\pi}{\lambda z}(x_0^2 + y_0^2) + 2\theta\right]dc \qquad \text{[Equation 10]}$$

Here, $I(x_0, y_0; z)$ represents the interference beam of the first spherical wave and the plane wave transferred by the second lens, z represents the distance from the focal position of the first spherical wave, to which the curvature is added by the second lens, to the object, and dc represents the direct current bias component.

As described above, when the second lens is inserted and disposed so that the focal position of the second lens is the same as the focal position of the second spherical wave, the hologram encoded by the linear Fresnel zone plate, which is the interference pattern between the spherical wave and the plane wave, may be obtained.

Next, a third embodiment of the present invention will be described. The third embodiment is a method of obtaining a noise-robust hologram as well as removing a dc component without using the first and second dc removal filters 181a and 181b by adding an additional photodetector to the first embodiment.

FIG. 4 is a diagram illustrating a third embodiment of a geometric phase in-line scanning holography system according to the present invention.

As illustrated in FIG. 4, a geometric phase in-line scanning holography system 300 according to a third embodiment includes a polarizer 110, a collimator 120, a polarization sensitive lens 130, a scan means 140, a concentrator 150, first to third beam splitters 355a, 355b, and 355c, first to fourth polarizers 360a, 360d, 360c, and 360d, first to fourth photodetectors 370a, 370b, 370c, and 370d, and an electronic processing unit 380.

In the third embodiment of FIG. 4, the structure of the concentrating part is changed from the structure of the first embodiment of FIG. 1. Therefore, in FIG. 4, since components having the same reference numerals as those in the first embodiment of FIG. 1 mean that the components perform the same operations, a separate description of the components denoted by the same reference numeral is omitted. In addition, the configuration of FIG. 4 may be applied to FIGS. 6, 8, and 9 later.

Hereinafter, components after the concentrator 150 will be mainly described.

The first beam splitter 355a receives the concentrated beam from the concentrator 150 and splits the concentrated beam into first and second output beams. The transmitted first output beam in the first beam splitter 355a is transferred to the second beam splitter 355b, and the reflected second output beam is transferred to the third beam splitter 355c.

The second beam splitter 355b splits the first output beam into 1a and 1b output beams. The transmitted 1a output beam in the second beam splitter 355b is transferred to the first polarizer 360a, and the reflected 1b output beam is transferred to the second polarizer 360b.

The third beam splitter 355c splits the second output beam again into 2a and 2b output beams. The transmitted 2a output beam in the third beam splitter 355c is transferred to the third polarizer 360c, and the reflected 2b output beam is transferred to the fourth polarizer 360d.

In this case, the second, third, and fourth polarizers 360b, 360c, and 360d have polarization directions rotated clockwise by 45 degrees, 90 degrees, and 135 degrees relative to the polarization direction of the first polarizer 360a, respectively.

The first to fourth photodetectors 370a, 370b, 370c, and 370d are installed to correspond to the first to fourth polarizers 360a, 360b, 360c, and 360d, respectively, and detect output beams passing through the first to fourth polarizers 360a, 360b, 360c, and 360d, respectively.

Here, as in the first embodiment, the first to fourth photodetectors 370a, 370b, 370c, and 370d generate first to fourth current signals corresponding to the intensities of the output beams passing through the first to fourth polarizers 360a, 360b, 360c, and 360d, respectively.

The detected first to fourth current signals are referred to as an $n^{th}$ current signal $I_{p_n}(x, y)$, and may be defined as in Equation 11 below.

$$\text{[Equation 11]}$$
$$I_{p_n}(x, y)$$
$$\int O(x_0, y_0; z) \otimes \left[\cos\left(\frac{2\pi f_{gp}}{\lambda(2f_{gp} + z)z}(x_0^2 + y_0^2) + p_n\right)\right]dz,$$
$$p_n = \left\{0, \frac{\pi}{2}, \pi, \frac{3\pi}{2}\right\}$$

Here, $n = \{1, 2, 3, 4\}$, which are indices corresponding to the first, second, third, and fourth photodetectors, respectively.

In addition, $p_n$ is the shifted phase of the hologram signal generated by the $n^{th}$ photodetector designated as n, $O(x_0, y_0; z)$ is the three-dimensional image of the object as the three-dimensional distribution for the transmittance of the object 10, $\otimes$ is the convolution operation, $\lambda$ is the wavelength of the beam used, $(x, y)$ is the scan position of the scan beam designated by the scan means 140, $f_{gp}$ is the focal distance of the polarization-sensitive lens, and z is the distance from the focal position of the second spherical wave to the object 10.

The first to fourth current signals according to Equation 11 are transferred to an AD converter 382 included in the electronic processing unit 380.

The electronic processing unit 380 processes the first to fourth current signals detected by the first to fourth photodetectors to generate complex holograms of the object, and includes the AD converter 382, a signal processing unit 383, a storage unit 384, and a scan control unit 385.

The AD converter 382 converts the first to fourth current signals into digital signals. The AD converter 382 has four input channels, and receives a 0 phase, a $\pi/2$ phase, a $\pi$ phase, and a $3\pi/2$ phase of Equation 11 through the channels and converts the phases into digital signals. The converted digital current signal is provided to the signal processing unit 383 together with the scanning position of the scan means 140.

The signal processing unit 383 generates a complex hologram of an object from the converted digital signals, and the storage unit 384 stores the generated complex hologram.

In this case, the complex hologram may be defined as in Equation 12 below.

$$I_H(x, y) = \{I_{p_s}(x, y) - jI_{p_1}(x, y)\} - j\{I_{p_2}(x, y) - jI_{p_0}(x, y)\} = \qquad \text{[Equation 12]}$$
$$\int O(x_0, y_0; z) \otimes \exp\left[j\frac{2\pi f_{gp}}{\lambda(2f_{gp} + z)z}(x_0^2 + y_0^2)\right]dz$$

The scan control unit 385 generates a control signal for changing the position of the scan means 140 whenever hologram processing is completed for an arbitrary position of the object, and transfers the control signal to the scan means 140. Of course, to this end, the signal processing unit 383 forms a two-dimensional array for each scan position by adding the signals according to each phase of Equation 11 by a complex number addition method as in Equation 12, and the storage unit 384 stores the two-dimensional array.

In addition, the signal processing unit 383 may form two-dimensional arrays for each scan position with respect to the signals of the respective phases of Equations 11 and transfers the two-dimensional arrays to the storage unit 384. When the scan is finished, the signal processing unit 383 may read the two-dimensional arrays from the storage unit 384 and add the two-dimensional arrays by the complex number addition method of Equation 12 and then store the result in the storage unit 384 again.

Next, a modification of the third embodiment will be described. This is a case where the third beam splitter 355c, the fourth polarizer 360d, and the fourth photodetector 370d are removed in the dashed-line box of FIG. 4, which is the diagram of the third embodiment.

At this time, the operations of the first and second beam splitters 355a and 355b are the same as those of the third embodiment. The difference from the third embodiment is that the second output beam reflected from the first beam splitter 355a is directly transferred to the third polarizer 360c and polarized, and the beam polarized through the third polarizer 360c is detected by the third photodetector 370c.

In the case of the modification, the three current signals output from the first, second, and third photodetectors 370a, 370b, and 370c are converted into digital signals by using the AD converter having the three channels and are transferred to the signal processing unit; and the signal processing unit may obtain the complex hologram by processing the digital signals by the method of Equation 13.

$$I_H(x, y) = I_{p_1}(x, y)\{\exp(jp_s) - \exp(jp_2)\} + I_{p_2}(x, y)\{\exp(jp_1) - \exp(jp_2)\} +$$

$$I_{p_s}(x, y)\{\exp(jp_2) - \exp(jp_1)\}$$

$$= \int O(x_0, y_0; z) \otimes \exp\left[j\frac{2\pi f_{gp}}{\lambda(2f_{gp}+z)z}(x_0^2 + y_0^2)\right]dz$$

[Equation 13]

According to the present invention as described above, since it is possible to obtain a complex hologram of a real object (transmissive object) free of twin image noise and background noise by using a geometric structure according to polarization without using a complicated modulation device for modulating an optical signal, the present invention may reduce the complexity of the structure, achieve miniaturization and weight reduction, and apply to mobile devices that are sensitive to energy consumption.

FIG. 5 is a diagram illustrating a fourth embodiment of a geometric phase in-line scanning holography system according to the present invention.

FIG. 5 illustrates that a lens 435 is additionally inserted between the polarization sensitive lens 130 and the scan means 140 in the structure of the third embodiment of FIG. 4. The principle thereof is the same as that of FIG. 3, and a separate description of the same components is omitted. When the lens 435 is additionally inserted, the same effects as in Equations 8 to 10 may be obtained.

Hereinafter, there is provided a technique for obtaining a hologram robust to phase fluctuation by canceling phase fluctuation generated at the scan position of the scan beam designated by the scan means 140 according to the vibration of the geometric phase in-line scanning holography system, the fluctuation of the light source, the optical misalignment, and the like.

FIG. 6 is a diagram illustrating a fifth embodiment of a geometric phase in-line scanning holography system according to the present invention. In the case of FIG. 6, a phase fluctuation compensation function is added to the structure of the first embodiment of FIG. 1.

As illustrated in FIG. 6, a geometric phase in-line scanning holography system 500 according to a fifth embodiment includes a polarizer 110, a collimator 120, a polarization sensitive lens 130, a scan means 140, a first concentrator 150, a first beam splitter 155, first and second polarizers 160a and 160b, first and second photodetectors 170a and 170b, an electronic processing unit 180-1, a second beam splitter 590, a second concentrator 595, and an R-concentrator (denoted by "R").

FIG. 6 illustrates that the second beam splitter 590, the second concentrator 595, and the R-concentrator (denoted by "R") are additionally inserted into the structure of the first embodiment of FIG. 1 in order to correct phase fluctuation caused by vibration of the system 500. A separate description of the remaining components denoted by the same reference numerals is omitted.

First, when comparing FIG. 6 with FIG. 1, it can be seen that the second beam splitter 590 is additionally disposed between the polarization sensitive lens 130 and the scan means 140).

The second beam splitter 590 serves to transmit a portion of an interference beam generated by the polarization sensitive lens 130 so as to be used for scanning an object, and to reflect and transfer a portion of the interference beam to the R-concentrator.

That is, the second beam splitter 590 transmits a portion of the interference beam incident on one side to the scan means 140 on the other side, and reflects and transfers a portion of the interference beam to the second concentrator 595 on the lower side. At this time, the second concentrator 595 spatially integrates the interference beam reflected from the second beam splitter 590. The second concentrator 595 may be implemented with the same element as the first concentrator 150.

The beam concentrated by the second concentrator 595 is transferred to the R-concentrator. The R-concentrator processes the beam reflected from the second beam splitter 590. Here, the R-concentrators 155-R+160a-R, 160b-R+170a, and 170b are disposed to be symmetrical with elements 155+160a, 160b+170a, and 170b located at the rear end of the first concentrator 150.

Specifically, the R-concentrator includes a 1-R beam splitter 155-R, 1-R and 2-R polarizers 160a-R and 160b-R, and 1-R and 2-R photodetectors 170a-R and 170b-R disposed to be symmetrical with the first beam splitter 155, the first and second polarizers 160a and 160b, and the first and second photodetectors 170a and 170b located at the rear end of the first concentrator 150.

Since the principles of splitting, polarization, and detection of the beam by the internal elements of the R-concentrator are the same as those described above, a detailed description thereof will be omitted. As such, the beam detected through the 1-R and 2-R photodetectors 170a-R and 170*b*-R, which are the last path of the R-concentrator, is transferred to the electronic processing unit 180-1.

The electronic processing unit 180-1 may use 1-R and 2-R current signals detected by the 1-R and 2-R photodetectors 170*a*-R and 170*b*-R as first and second phase correction reference signals for compensating for the phase fluctuation caused by the vibration of the system 500.

In addition, compared to FIG. 1, the electronic processing unit 180-1 of FIG. 6 further includes 1-R and 2-R dc removal filters 181*c* and 181*d* together with the first and second dc removal filters 181*a* and 181*b*.

That is, in the first embodiment of FIG. 1, dc removal is performed on the first and second current signals detected by concentrating the beam transmitted from the object by the first and second dc removal filters 181*a* and 181*b* before signal processing, the fifth embodiment of FIG. 6 further includes a process of removal dc components from the 1-R and 2-R current signals (hereinafter, first and second phase correction reference signals) detected by concentrating the interference beam at the front end of the scan means 140 through 1-R and 2-R dc removal filters 181*c* and 181*d*.

The 1-R and 2-R current signals from which the de components are removed may be expressed as Equations 14 and 15 below.

$$I_0^{Ph-Flu}(x, y) = \cos[\delta(x, y)] \qquad \text{[Equation 14]}$$

$$I_{\pi/2}^{Ph-Flu}(x, y) = \cos\left[\delta(x, y) + \frac{\pi}{2}\right] \qquad \text{[Equation 15]}$$

Here, $\delta(x,y)$ is the phase fluctuation at the scan position of the scan beam designated by the scan means 140 according to the vibration of the system, the fluctuation of the light source, the optical misalignment, and the like (hereinafter, referred to as the 'vibration of the system').

Of course, in FIG. 6, the electronic processing unit 180-1 processes the first and second current signals detected by the first and second photodetectors 170*a* and 170*b* in the same manner as in FIG. 1 to generate the complex hologram of the object. Additionally, the electronic processing unit 180-1 processes the 1-R and 2-R current signals detected by the 1-R and 2-R photodetectors 170*a*-R and 170*b*-R to generate the complex hologram for phase correction. The complex hologram for phase correction is reflected to the complex hologram of the object to correct the phase fluctuation caused by the vibration of the system.

To this end, the AD converter 182-1 converts the first and second phase correction reference signals, from which the de components are removed, into digital signals. The signal processing unit 183-1 generates the complex hologram for phase correction from the converted digital signals, and then corrects the phase fluctuation of the system 500 by multiplying the complex conjugate of the complex hologram for phase correction by the complex hologram of the object stored in the storage unit 184-1.

More specifically, the AD converter 182-1 receives the in-phase signal of Equation 14 and the π/2 phase signal of Equation 15 through the respective channels and converts the received signals into digital signals. The signal processing unit 183-1 generates the complex hologram for phase correction from the converted digital signals and stores the complex hologram in the storage unit 184-1.

In this case, the complex hologram for phase correction may be defined as in Equation 16 below.

$$I^{Ph-Flu}(x, y) = I_0^{Ph-Flu}(x, y) - jI_{\pi/2}^{Ph-Flu}(x, y) \qquad \text{[Equation 16]}$$

$$= \exp[-j\delta(x, y)]$$

The scan control unit 185-1 generates a control signal for changing the position of the scan means 140 whenever hologram processing is completed for an arbitrary position of the object, and transfers the control signal to the scan means 140. Of course, to this end, the signal processing unit 183-1 adds Equations 14 and 15 by using a complex number addition method as in Equation 16 to form a two-dimensional array for each scan position, and the storage unit 184-1 stores the two-dimensional array.

Of course, even in this case, the AD converter 182-1 may receive the outputs of the 1-R and 2-R photodetectors 170*a*-R and 170*b*-R, convert the outputs of the 1-R and 2-R photodetectors 170*a*-R and 170*b*-R into digital signals, and perform dc rejection filtering through a digital signal processing method.

In addition, the signal processing unit 183-1 may form two-dimensional arrays for each scan position with respect to Equations 14 and 15 and transfer the two-dimensional arrays to the storage unit. When the scan is finished, the signal processing unit 183-1 may read the two-dimensional arrays from the storage unit and add the two-dimensional arrays by the complex number addition method of Equation 16 and then store the result in the storage unit again.

On the other hand, since the hologram of the object stored in the storage unit includes the phase fluctuation component at the scan position designated by the scan means, the signal processing unit 183-1 corrects the phase fluctuation by multiplying the complex conjugate of the phase fluctuation obtained by Equation 16 by the hologram of the object stored in the storage unit.

FIG. 7 is a diagram illustrating a modification of FIG. 6. In FIG. 7, a lens 235 is further added to FIG. 6. Since the effect of the lens has been described with reference to FIG. 3, a redundant description thereof will be omitted.

FIG. 8 is a diagram illustrating a sixth embodiment of a geometric phase in-line scanning holography system according to the present invention. In the case of FIG. 8, a phase fluctuation compensation function is added to the structure of the third embodiment of FIG. 4.

As illustrated in FIG. 8, a geometric phase in-line scanning holography system 600 according to a sixth embodiment includes a polarizer 110, a collimator 120, a polarization sensitive lens 130, a scan means 140, a first concentrator 150, first to third beam splitters 355*a*, 355*b*, and 355*c*, first to fourth polarizers 360*a*, 360*b*, 360*c*, and 360*d*, first to fourth photodetectors 370*a*, 370*b*, 370*c*, and 370*d*, an electronic processing unit 380-1, a fourth beam splitter 690, a second concentrator 695, and an R-concentrator (denoted by "R").

FIG. 8 illustrates that the fourth beam splitter 690, the second concentrator 695, and the R-concentrator (denoted by "R") are additionally inserted into the structure of the third embodiment of FIG. 4 in order to correct phase fluctuation caused by vibration of the system 600. A separate description of the remaining components denoted by the same reference numerals is omitted.

First, when comparing FIG. 8 with FIG. 4, it can be seen that the fourth beam splitter 690 is additionally disposed between the polarization sensitive lens 130 and the scan means 140. The fourth beam splitter 690 serves to transmit a portion of an interference beam generated by the polarization sensitive lens 130 so as to be used for scanning an object, and to reflect and transfer a portion of the interference beam to the R-concentrator.

That is, the fourth beam splitter 690 transmits a portion of the interference beam incident on one side to the scan means 140 on the other side, and reflects and transfers a portion of the interference beam to the second concentrator 695 on the lower side. In this case, the second concentrator 695 spatially integrates the interference beam reflected from the second beam splitter 690 and may be implemented with the same element as the first concentrator 150.

$$I_H(x, y) = I_{p_1}(x, y)\{\exp(jp_s) - \exp(jp_2)\} + I_{p_2}(x, y)\{\exp(jp_1) - \exp(jp_2)\} + \quad \text{[Equation 19]}$$

$$I_{p_s}(x, y)\{\exp(jp_2) - \exp(jp_1)\}$$

$$= \exp[-j\delta(x, y)]$$

The beam concentrated by the second concentrator 695 is transferred to the R-concentrator. The R-concentrator processes the beam reflected from the fourth beam splitter 690. In FIG. 8, the R-concentrators 355a-R, 355b-R, 355c-R+ 360a-R, 360b-R, 360c-R, 360d-R+370a-R, 370b-R, 370c-R, and 370d-R are disposed to be symmetrical with elements 355a, 355b, 355c+360a, 360b, 360c, 360d+370a, 370b, 370c, and 370d located at the rear end of the first concentrator 150.

Specifically, the R-concentrator includes 1-R to 3-R beam splitters 355a-R, 355b-R, and 355c-R, 1-R to 4-R polarizers 360a-R, 360b-R, 360c-R, and 360d-R, and 1-R to 4-R photodetectors 370a, 370b, 370c, and 370d disposed to be symmetrical with the first to third beam splitters 355a to 355c, the first to fourth second polarizers 360a to 360d, and the first and second photodetectors 370a to 370d located at the rear end of the first concentrator 150.

Since the principles of separation, polarization, and detection of the beam by the internal elements of the R-concentrator are the same as those described above, a detailed description thereof will be omitted. The beam detected through the 1-R and 4-R photodetectors 370a, 370b, 370c, and 370d, which are the last path of the R-concentrator, is transferred to the electronic processing unit 380-1.

The electronic processing unit 380-1 may use 1-R to 4-R current signals detected by the 1-R and 4-R photodetectors 370a, 370b, 370c, and 370d as first to fourth phase correction reference signals for compensating for the phase fluctuation caused by the vibration of the system 600.

In the case of the configuration of FIG. 4, since de rejection is possible without the dc rejection filters, FIG. 8 also does not require separate dc rejection filters.

The 1-R to 4-R current signals may be expressed as Equations 17 and 18 below.

$$I_{p_n}^{Ph-Flu}(x, y) = \cos[\delta(x, y) + p_n], \ p_n = \left\{0, \frac{\pi}{2}, \pi, \frac{3\pi}{2}\right\} \quad \text{[Equation 17]}$$

$$P^{Ph-Flu}(x, y) = \{I_{p_3}(x, y) - jI_{p_1}(x.y)\} - j\{I_{p_2}(x, y) - jI_{p_0}(x, y)\} \quad \text{[Equation 18]}$$

$$= \exp[-j\delta(x, y)]$$

Here, $\delta(x,y)$ represents the phase fluctuation component.

Of course, in FIG. 8, the electronic processing unit 380-1 processes the first to fourth current signals detected by the first to fourth photodetectors 370a to 370d in the same manner as in FIG. 4 to generate the complex hologram of the object. Additionally, the electronic processing unit 380-1 processes the 1-R to 4-R current signals detected by the 1-R to 4-R photodetectors 370a-R to 370d-R to generate the complex hologram for phase correction.

The complex hologram for phase correction is reflected to the complex hologram of the object to correct the phase fluctuation caused by the vibration of the system. The complex hologram for phase correction may be defined as in Equation 19 below.

FIG. 9 is a diagram illustrating a modification of FIG. 8. In FIG. 9, a lens 435 is further added to FIG. 8. Since the effect of the lens has been described above, a redundant description thereof will be omitted.

The first to sixth embodiments of the present invention have been described as concentrating light transmitted through an object. However, when the object is a phosphor that emits fluorescent light, the fluorescent light emitted from the object is concentrated by using the concentrator and transferred to each photodetector, and each photodetector may detect light spatially integrated through the concentrator and record the hologram of the phosphor. At this time, an optical filter including a dichroic mirror for filtering light corresponding to the wavelength of the fluorescent light emitted from the object and transferring the filtered light to the photodetector is positioned between each photodetector and the object, thereby reducing optical noise.

In addition, when the object is a transmissive object that transmits light as in the embodiment of the present invention, the concentrator and each photodetector may be positioned on the path of the light transmitted through the object, the light transmitted through the object may be concentrated by using the concentrator and transferred to each photodetector, each photodetector may detect light spatially integrated through the concentrator, and the hologram of the transmissive object may be recorded.

Also, in the first to sixth embodiments, a spatial filter including a Fourier lens and a pin-hole located at the focal point of the Fourier lens is placed between each photodetector and the object and spatially filters light reflected or transmitted from the object, a hologram including a phase distribution of the object may be obtained.

As described above, according to the present invention, since the scanning pattern is formed on the single optical path by using the polarization sensitive lens, it is possible to implement high-efficiency and high-quality light scanning holography. In addition, there is an advantage of being robust and stable in external environments by using an optical system structure with high stability and low complexity.

Furthermore, since it is possible to obtain a complex hologram of a transmissive object free of twin image noise and background noise by using a geometric structure according to polarization without using a complicated modulation device for modulating an optical signal, the present invention may provide an advantage of reducing the complexity of the structure, achieving the miniaturization and weight reduction, and applying to mobile devices that are sensitive to energy consumption.

The present invention has been described with reference to the embodiments illustrated in the drawings, but this is only an example. It will be understood by those of ordinary skill in the art that various modifications and equivalents thereto may be made thereto. Accordingly, the true technical protection scope of the present invention should be defined by the technical spirit of the appended claims.

The invention claimed is:

1. A geometric phase in-line scanning holography system for a transmissive object, comprising:

a polarization sensitive lens which receives a linearly polarized beam to generate a first spherical wave of right-handed circularly polarized light having a negative focal distance and a second spherical wave of left-handed circularly polarized light having a positive focal distance;

a scan means which scans the transmissive object by using an interference beam generated between the generated first and second spherical waves;

a first beam splitter which receives a beam having been transmitted through the transmissive object and splits the received beam into first and second output beams;

first and second polarizers which polarize the first and second output beams, respectively; and first and second photodetectors which detect output beams having passed through the first and second polarizers.

2. The geometric phase in-line scanning holography system of claim 1, wherein the polarization sensitive lens includes a geometric phase lens.

3. The geometric phase in-line scanning holography system of claim 1, further comprising a light source-side polarizer which generates a linearly polarized beam from an input light source and provides the generated linearly polarized beam to the polarization sensitive lens.

4. The geometric phase in-line scanning holography system of claim 1, wherein the interference beam is defined by the following equation in the form of a geometric phase Fresnel zone plate:

$$I_{GP-FZP}(x_0, y_0; z) = \cos\left[\frac{2\pi f_{gp}}{\lambda(2f_{gp}+z)z}(x_0^2+y_0^2)+2\theta\right]$$

wherein $I_{GP-FZP}(x_0, y_0; z)$ represents the interference beam of the first and second spherical waves formed by the polarization sensitive lens, $\lambda$ represents a wavelength of the beam used, $f_{gp}$ is a focal distance of the polarization sensitive lens, $(x_0^2+y_0^2)$ represents a Cartesian coordinate system in which $(x_0,y_0)$ is a plane orthogonal to an optical axis of the linearly polarized beam, z represents a distance from the focal position of the second spherical wave to the object, and $\theta$ represents a clockwise linearly polarized angle with respect to the polarization axis of the light source-side polarizer that generates the linearly polarized beam from the light source and provides the generated linearly polarized beam.

5. The geometric phase in-line scanning holography system of claim 4, further comprising a first lens which is installed between the polarization sensitive lens and the scan means and which adjusts a distance between focal points of the first and second spherical waves and images a pattern of a surface of the polarization sensitive lens to a surface of an object area, wherein the interference beam is defined by the following equation in the form of a geometric phase Fresnel zone plate:

$$I(x_0, y_0; z_{img}) =$$
$$\cos\left[\frac{2\pi M_{img}^2 f_{gp}}{\lambda(2M_{img}^2 f_{gp}+z_{img})z_{img}}(M_{img}^2 x_0^2+M_{img}^2 y_0^2)+2\theta\right]+dc \text{ or}$$
$$I(x_0, y_0; z_{img}) = \cos\left[\frac{2\pi M_{img}^2 f_{gp}}{\lambda(z_{img}^2-M_{img}^4 f_{gp}^2)}(M_{img}^2 x_0^2+M_{img}^2 y_0^2)+2\theta\right]+dc$$

wherein, $I(x_0, y_0; z_{img})$ represents the interference beam of the first and second spherical waves imaged on the object area by the first lens, $M_{img}$ represents the zooming-in or zooming-out ratio of the image by the first lens when imaging the pattern on the surface of the polarization sensitive lens to the surface of the object area, $z_{img}$ represents the distance from the focal position of the second spherical wave to the object, $2M^2_{img}f_{gp}$ represents the distance between the focal points of the adjusted first and second spherical waves, and dc represents a de bias component.

6. The geometric phase in-line scanning holography system of claim 4, further comprising a second lens which is installed between the polarization sensitive lens and the scan means and which has a same focal position as the second spherical wave and converting the second spherical wave into a plane wave, wherein the interference beam is defined by the following equation in the form of a linear Fresnel zone plate formed by interference between the first spherical wave and the plane wave:

$$I(x_0, y_0; z) = \cos\left[\frac{\pi}{\lambda z}(x_0^2+y_0^2)+2\theta\right]+dc$$

wherein, $I(x_0, y_0; z)$ represents the interference beam of the first spherical wave and the plane wave transferred by the second lens, z represents the distance from the focal position of the first spherical wave, to which a curvature is added by the second lens, to the object, and dc represents a direct current bias component.

7. The geometric phase in-line scanning holography system of claim 1, wherein the first beam splitter transmits a part of an incident beam and reflects a part of the incident beam to split the incident beam into two beams, and the second polarizer has a polarization direction rotated clockwise by 45 degrees with respect to a polarization direction of the first polarizer.

8. The geometric phase in-line scanning holography system of claim 1, further comprising an electronic processing unit which generates a complex hologram of the object by processing first and second current signals detected by the first and second photodetectors, wherein the first and second photodetectors generate the first and second current signals corresponding to intensities of the first and second output beams passing through the first and second polarizers, respectively.

9. The geometric phase in-line scanning holography system of claim 8, wherein the first and second current signals $$\left( I_0^{dc}(x,\, y),\, I_{\pi/2}^{dc}(x,\, y) \right)$$

generated by the first and second photodetectors are defined by the following equation:

$$I_0^{dc}(x,\, y) = \int O(x_0,\, y_0;\, z) \otimes \left\{ \cos\left[ \frac{2\pi f_{gp}}{\lambda(2f_{gp}+z)z}(x_0^2 + y_0^2) \right] + dc \right\} dz$$

$$I_{\pi/2}^{dc}(x,\, y) = \int O(x_0,\, y_0;\, z) \otimes \left\{ \cos\left[ \frac{2\pi f_{gp}}{\lambda(2f_{gp}+z)z}(x_0^2 + y_0^2) + \frac{\pi}{2} \right] + dc \right\} dz$$

wherein $O(x_0, y_0; z)$ represents a three-dimensional image of the object as a three-dimensional distribution for transmittance of the object, $\otimes$ represents a convolution operation, $\lambda$ represents a wavelength of the beam used, $(x,\ y)$ represents a scan position of a scan beam designated by the scan means, $f_{gp}$ represents a focal distance of the polarization sensitive lens, $(x_0^2 + y_0^2)$ represents a Cartersian coordinate system in which $(x_0, y_0)$ is a plane orthogonal to an optical axis of the linearly polarized beam, z represents a distance from the focal position of the second spherical wave to the object, and dc represents a dc bias component.

10. The geometric phase in-line scanning holography system of claim 8, wherein the electronic processing unit includes:

first and second dc removal filters which remove a dc component, which is a direct current bias component, from the first and second current signals and input the first and second current signals, from which the dc component is removed, to an AD converter;

the AD converter which converts the first and second current signals, from which the dc component is filtered, into digital signals;

a signal processing unit which generates a complex hologram of the object from the converted digital signals;

a storage unit which stores the complex hologram; and a scan control unit which generates a control signal for changing a position of the scan means whenever hologram processing is completed for an arbitrary position of the object.

* * * * *